United States Patent
Castellano

(10) Patent No.: US 6,611,884 B2
(45) Date of Patent: *Aug. 26, 2003

(54) SELF-ADJUSTING ELASTICITY DATA BUFFER WITH PRELOAD VALUE

(76) Inventor: Andrew J. Castellano, 295 Dolphin Way, Unit A, Laguna Beach, CA (US) 92651

(*) Notice: Subject to any disclaimer, the term of this patent is extended or adjusted under 35 U.S.C. 154(b) by 0 days.

This patent is subject to a terminal disclaimer.

(21) Appl. No.: 10/102,015

(22) Filed: Mar. 21, 2002

(65) Prior Publication Data

US 2002/0174273 A1 Nov. 21, 2002

Related U.S. Application Data

(60) Continuation of application No. 09/617,073, filed on Jul. 17, 2000, now Pat. No. 6,408,349, which is a division of application No. 09/246,038, filed on Feb. 5, 1999, now Pat. No. 6,233,629.

(51) Int. Cl.[7] .................. G06F 13/28; G06F 13/00; G06F 3/00
(52) U.S. Cl. .................. 710/29; 710/33; 710/52; 710/56
(58) Field of Search .................. 710/29, 52, 56, 710/60, 33, 58

(56) References Cited

U.S. PATENT DOCUMENTS

| 4,258,418 A |   | 3/1981 | Heath .................. 710/53 |
| 4,600,945 A | * | 7/1986 | Bolger .................. 348/806 |
| 4,860,193 A |   | 8/1989 | Bentley et al. .................. 710/55 |
| 5,038,277 A |   | 8/1991 | Altman et al. .................. 710/56 |
| 5,117,486 A |   | 5/1992 | Clark et al. .................. 710/128 |
| 5,179,662 A |   | 1/1993 | Corrigan et al. .................. 711/2 |
| 5,210,829 A |   | 5/1993 | Bitner .................. 710/57 |
| 5,263,056 A |   | 11/1993 | Urbansky .................. 375/363 |
| 5,278,956 A |   | 1/1994 | Thomsen et al. .................. 711/167 |

(List continued on next page.)

FOREIGN PATENT DOCUMENTS

| EP |   | 0247317 |   | 12/1987 |
| JP |   | 404067248 A | * | 3/1992 |
| WO |   | WO 95/22233 |   | 8/1995 |
| WO |   | 97/17777 | * | 5/1997 |

OTHER PUBLICATIONS

"Programmable High Performance Memory Buffer", IBM Technical Disclosure Bulletin, vol. 36, No. 10, Oct. 1993, pp 569–570.

*Primary Examiner*—Thomas Lee
*Assistant Examiner*—Chun Cao

(57) ABSTRACT

The drift between a write pointer and a read pointer processing packets of data through a FIFO buffer is compensated for by adjusting the start of the read pointer relative to the write pointer. The FIFO buffer is sized to include a number of storage cells equal to the product of the maximum frequency offset between the write clock and read clock and the maximum number of data units in a packet. Initially the start of the read pointer is delayed, relative to the write pointer, by a portion of the number of storage cells in the FIFO. During the processing of a data packet it is determined whether the read pointer is drifting toward or away from the write pointer. If the read pointer is drifting away from the write pointer, for subsequent data packets, the read pointer is started almost immediately after the write pointer writes to the first storage cell in the FIFO. If the read pointer is drifting toward the write pointer, for subsequent data packets, the read pointer is started almost immediately prior to the time at which the write pointer writes to the last storage cell in the FIFO.

8 Claims, 5 Drawing Sheets

U.S. PATENT DOCUMENTS

| | | | |
|---|---|---|---|
| 5,337,315 A | 8/1994 | Ehrlich | 370/505 |
| 5,673,396 A | 9/1997 | Smolansky et al. | 710/127 |
| 5,859,882 A * | 1/1999 | Urbansky | 375/375 |
| 5,884,099 A | 3/1999 | Klingelhofer | 710/52 |
| 5,918,073 A | 6/1999 | Hewitt | 377/47 |
| 6,105,070 A | 8/2000 | Gaylord | 709/232 |
| 6,233,629 B1 * | 5/2001 | Castellano | 710/29 |
| 6,408,349 B1 * | 6/2002 | Castellano | 710/56 |

* cited by examiner

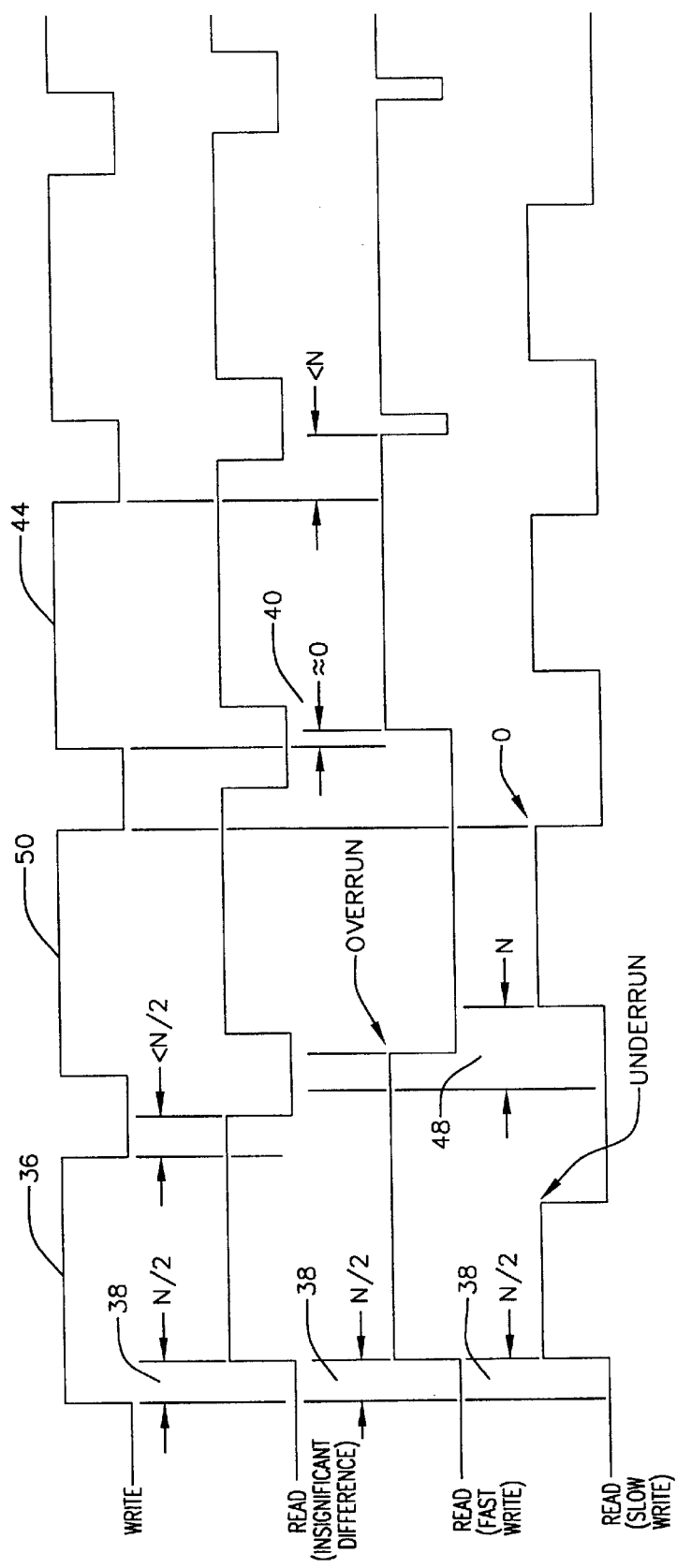

SELF-ADJUSTING ELASTICITY DATA BUFFER WITH PRELOAD VALUE

This is a continuation of application Ser. No. 09/617,073, filed Jul. 17, 2000, now U.S. Pat. No. 6,408,349, which in turn is a Divisional Application of parent application Ser. No. 09/246,038, filed Feb. 5, 1999, now U.S. Pat. No. 6,233,629, issued May 15, 2001. The disclosure of the prior applications is hereby incorporated by reference herein in its entirety.

BACKGROUND OF THE INVENTION

1. Field of the Invention

This invention relates to buffers used within data communications systems and more particularly to a self-adjusting elasticity buffer for processing packets or streams of data. A "packet" or "stream", as used within context of this disclosure, is a collection of individual data units, such as 2-bit, 4-bit or 8-bit words, which form a contiguous group of data.

2. Description of Related Art

Data communication devices, such as shown in FIG. 1, often use elasticity buffers to re-synchronize a data stream from one clock domain to another. Within the receiver (RX), the data stream is written into an elasticity buffer in accordance with a receive clock signal (RX CLK), i.e., write clock, in the form of original receive data (RX DATA), i.e., write data. The RX DATA is subsequently read out of the buffer in accordance with a transmit clock signal (TX CLK), i.e., read clock. Thus when the read data is received by the transmitter it is synchronous with the transmit clock.

In a typical implementation, the elasticity buffer is implemented using a first-in first-out (FIFO) buffer that writes data words using a write clock and reads the data words using a separate read clock. With reference to FIG. 2, each of the words in the data stream is individually written into the buffer in individual cells beginning at 0, as indicated by the write pointer. Once data is written into the cell numbered N, data is read from the buffer beginning at cell 0, as indicated by the read pointer. The write pointer continues to write data to buffer cells N+1 through 2N as the read pointer continues to read data. After writing data to the 2N cell the write pointer begins writing data to the 0 cell again, thus the buffer is circular in nature.

Ideally, when the read clock and write clock are operating at the same frequency, the read pointer lags the write pointer by N words through the entire write/read cycle. However, the read clock and write clock inputs to the elasticity buffer are often offset in frequency. The frequency offset causes relative movement between the read and write pointers which, overtime increases or decreases the gap between the two pointers depending on the frequencies of the write and read clocks. This relative movement of the read and write pointers is referred to as "drift." When data is being written to the buffer faster than it is being read, the write pointer drifts toward the read pointer and eventually passes the read pointer. This condition is referred to as an "overrun" because the write pointer writes data to a buffer cell which contains data which has not yet be read by the read pointer. When data is being read from the buffer faster than it is being written, the read pointer drifts toward the write pointer and eventually passes the write pointer. This condition is referred to as an "underrun" because the read pointer reads data from a buffer which has not yet had data written to it by the write pointer. Either an overrun or underrun condition results in the corruption of data. The system typically includes a mechanism for detecting these conditions and providing an error signal.

Current designs of the elasticity buffer attempt to compensate for overrun and underrun conditions by sizing the elasticity buffer to accommodate for the maximum "frequency offsets" between the write and read clocks. The frequency offset is relative to the data rate of the system and is defined by the following equation:

$$freq\ offset = \frac{|W_{freq} - R_{freq}|}{D_{rate}} \quad \text{(Eq. 1)}$$

where:

$W_{freq}$=frequency of the write clock $R_{freq}$=frequency of the read clock $D_{rate}$=data rate of the system Accordingly, if the data rate of the system is 50 Mhz and the difference between the write clock and read clock frequencies is 10 kHz the frequency offset is 0.0002. This value is commonly expressed as 200 part-per-million (ppm).

In a standard elasticity buffer the FIFO size is at least 2N, where N is defined by the following equation:

$$N = freq\ offset_{max} \times data\ length_{max} \quad \text{(Eq. 2)}$$

where:

freq offset$_{max}$=the maximum frequency offset as determined using Eq. 1 data length$_{max}$=the maximum length of the data stream in words

For a maximum frequency offset of 200 ppm and a maximum data stream length of 40,000 words, N equals 8. Thus, the size of the standard elasticity buffer is 16. In operation, the elasticity buffer is loaded halfway, to a "preload value" of N, before the reading of data begins. This allows the read pointer to drift N words in either direction without causing a loss of data by an overrun or underrun condition. This preloading, however, introduces an initial delay in the reading of data, this delay is referred to as a latency and is described further below.

Disadvantages associated with this implementation of the elasticity buffer include the FIFO size and latency. As mentioned above, the size of the buffer is at least 2N in order to accommodate the maximum possible drift between the read and write pointers. Latency is the amount of time between the writing of a word into the buffer and the reading of a word from the buffer. The latency between the data in and data out of the buffer are shown in FIGS. 3a through 3c. As shown in FIG. 3a. the latency at the start of the data stream is N, because N words are written before the read pointer starts reading. At the end of the data stream, the latency is between 0 and 2N words, depending on the relative frequencies of the write and read clocks. If the clocks are running at the same frequency the latency is N, as shown in FIG. 3a. If the read clock is running faster than the write clock the latency approaches zero, as shown in FIG. 3b, whereas if the write clock is running faster than the read clock the latency approaches 2N, as shown in FIG. 3c. As the latency approaches 2N the possibility of the present data stream interfering with a subsequent data stream increases.

Thus there exists a need in the art to provide a buffer of reduced size with reduced latency at the end of a data stream. The present invention fulfills these needs.

SUMMARY OF THE INVENTION

Briefly, and in general terms, the invention relates to methods of, and systems for, processing data through a buffer.

In one embodiment, the invention relates to a method of processing a plurality of data packets, each having a number of data units, through a buffer in accordance with a write clock and a read clock. The buffer has a plurality of sequentially numbered storage cells. The method includes the steps of selecting an initial preload value; writing the data units into the storage cells using a write pointer operating in accordance with the write clock; and when the storage cell of the buffer having the number equal to the preload value has been written to, reading data units from the storage cells using a read pointer operating in accordance with the read clock. The method further includes the steps of determining the relative frequencies of the write and read clocks; and for subsequent data packets, selectively adjusting the preload value to compensate for differences between the write frequency and the read frequency.

By adjusting the preload value to compensate for differences between the write frequency and the read frequency, the present invention prevents the over writing of data into a storage cell which contains data which has not yet been read and prevents the reading of storage cells which have not yet had data written to.

In an additional aspect of this embodiment the write pointer and read pointer each have a counter associated therewith and the step of determining the relative frequencies of the write and read clocks includes the step of, after the start of the reading of data by the read pointer and during the writing of data from the first data packet, comparing the value of the write-pointer counter with the value of the read-pointer counter. In a further aspect, the step of selectively adjusting the preload value comprises the steps of, if the read-pointer counter value is less than the write-pointer counter value by an amount greater than the initial preload value, setting the preload value to a low preload value having a value less than the initial preload value; and if the read-pointer counter value is less than the write-pointer counter value by an amount less than the initial preload value, setting the preload value to a high preload value having a value greater than the initial preload value. In another facet of this embodiment, the write pointer and read pointer each have a counter associated therewith and the step of determining the relative frequencies of the write and read clocks comprises the step of, at the end of the writing of the first data packet, counting the number of words read by the read pointer in order to empty the storage cells. In a further facet, the step of selectively adjusting the preload value comprises the steps of, if the number of words counted is greater than the initial preload value, setting the preload value to a low preload value having a value less than the initial preload value; and if the number of words counted is less than the initial preload value, setting the preload value to a high preload value having a value greater than the initial preload value. In yet another aspect of this embodiment, the write clock and the read clock each have a frequency counter associated therewith and the step of determining the relative frequencies of the write and read clocks comprises the steps of, counting the cycles of the write clock during a fixed period of time; and counting the cycles of the read clock during the same fixed period of time. In a further aspect, the step of adjusting the preload value comprises the steps of, if the write clock frequency is greater than the read clock frequency, setting the preload value to a low preload value having a value less than the initial preload value; and if the write clock frequency is less than the read clock frequency, setting the preload value to a high preload value having a value greater than the initial preload value.

In another embodiment, the invention relates to a method of compensating for the drift between a write pointer and a read pointer processing packets of data having a number of data units through a FIFO buffer. The write and read pointers operate in accordance with a write and read clock respectively. The method includes the steps of sizing the FIFO buffer to include a number of storage cells equal to the product of the maximum frequency offset between the write clock and read clock and the maximum number of data units in a packet; delaying the start of the read pointer, relative to the write pointer, by a portion of the number of storage cells in the FIFO; and determining if the read pointer is drifting toward or away from the write pointer. The method further includes the steps of, if the read pointer is drifting away from the write pointer, for subsequent data packets, starting the read pointer almost immediately after the write pointer writes to the first storage cell in the FIFO; and if the read pointer is drifting toward the write pointer, for subsequent data packets, starting the read pointer almost immediately prior to the time at which the write pointer writes to the last storage cell in the FIFO.

By sizing the FIFO buffer to include a number of storage cells equal to the product of the maximum frequency offset between the write clock and read clock and the maximum number of data units in a packet and by adjusting the starting of the read pointer based on the drift of the read pointer, the maximum latency at the end of the data stream is reduced compared to the latency associated with a standard FIFO buffer. Furthermore, the FIFO size is reduced compared to a standard FIFO buffer, thus reducing the overall cost of the system.

In an additional facet of this embodiment, the write pointer and read pointer each have a counter associated therewith and the step of determining if the read pointer is drifting toward or away from the write pointer comprises the steps of, after the start of the reading of data by the read pointer and during the writing of data from the first data packet, comparing the value of the write-pointer counter to the value of the read-pointer counter; if the read-pointer counter value is less than the write-pointer counter value by an amount greater than the number of storage cells which the start of the read pointer was delayed, indicating that the read pointer is drifting away from the write pointer; and if the read-pointer counter value is less than the write-pointer counter value by an amount less than the number of storage cells which the start of the read pointer was delayed, indicating that the read pointer is drifting toward the write pointer. In another facet, the write pointer and read pointer each have a counter associated therewith and the step of determining if the read pointer is drifting toward or away from the write pointer comprises the steps of, at the end of the writing of the first data packet, counting the number of words read by the read pointer in order to empty the FIFO storage cells; if the number of words counted is greater than the number of storage cells which the start of the read pointer was delayed, indicating that the read pointer is drifting away from the write pointer; and if the number of words counted is less than the number of storage cells which the start of the read pointer was delayed, indicating that the read pointer is drifting toward the write pointer. In yet another aspect, the write clock and the read clock each have a frequency counter associated therewith and the step of determining if the read pointer is drifting toward or away from the write pointer comprises the steps of, counting the cycles of the write clock during a fixed period of time and counting the cycles of the read clock during the same fixed period of time. The step further includes the steps of, if the write clock frequency is greater than the read clock frequency, indicating that the read pointer is drifting away from the write pointer; and if the write clock frequency is less than the read clock frequency, indicating that the read pointer is drifting toward the write pointer.

In another embodiment, the invention relates to a method of processing a plurality of data packets, each having a number of data units, through a buffer in accordance with a write clock and a read clock. The buffer has a plurality of sequentially numbered storage cells. The method includes the steps of writing data to the storage cells in accordance with the write clock frequency; reading data from the storage cells in accordance with the read clock frequency; and adjusting the time at which data is begun to be read relative to the time at which data is begun to be written to prevent the over writing of data into a storage cell which contains data which has not yet been read and to prevent the reading of storage cells which have not yet had data written to.

In another embodiment, the invention relates to a system for processing packets of data having a number of data units. The system includes a read clock having an operating frequency; a write clock having an operating frequency; and a FIFO having a number of storage cells substantially equal to the product of the maximum frequency offset and the maximum number of data units in the data packets. The system further includes a write pointer for writing data to the storage cells in accordance with the write clock frequency; a read pointer for reading data from the storage cells in accordance with the read clock frequency; and a state machine for controlling the time at which the read pointer starts reading data.

In an additional facet of this embodiment, the state machine includes means for delaying the start of the read pointer relative to the write pointer by a default preload value equal to a portion of the total number of storage cells in the FIFO and means for calculating the relative positions of the write pointer and read pointer. The state machine further includes means for selectively adjusting the preload value depending on the relative positions of the write pointer and read pointer. In a further aspect, the calculating means includes a write-pointer counter for counting the number of storage cells written to by the write pointer; a read-pointer counter for counting the number of storage cells read by the read pointer; and means for comparing the values of the read-pointer counter and the write-pointer counter after the start of the reading of data by the read pointer and during the writing of data from the first data packet. In a further aspect, the adjusting means includes means for setting the preload value to a low preload value having a value less than the initial preload value if the read-pointer counter value is less than the write-pointer counter value by an amount greater than the initial preload value; and means for setting the preload value to a high preload value having a value greater than the initial preload value if the read-pointer counter value is less than the write-pointer counter value by an amount less than the initial preload value. In other facets of this embodiment, the calculating means includes a read-pointer counter for counting the number of words read by the read pointer in order to empty the FIFO storage cells after the end of the writing of a data packet and the adjusting means includes means for setting the preload value to a low preload value having a value less than the initial preload value if the number of words counted is greater than the initial preload value; and means for setting the preload value to a high preload value having a value greater than the initial preload value if the number of words counted is less than the initial preload value. In other facets of this embodiment, the calculating means includes a write-clock frequency counter for determining the frequency of the write clock; a read-clock frequency counter for determining the frequency of the read clock; and a device for comparing the write-clock frequency and the read-clock frequency and producing as output, the difference between the two and the adjusting means includes means for setting the preload value to a low preload value having a value less than the initial preload value when the write clock frequency is greater than the read clock frequency; and means for setting the preload value to a high preload value having a value greater than the initial preload value when the write clock frequency is less than the read clock frequency.

In another embodiment, the invention relates to a buffer for allowing the influx and outflow of a number of data units forming a data stream. The buffer is for use in a system having a write clock and a read clock and includes a write pointer for writing data in accordance with the frequency of the write clock and a read pointer for reading data in accordance with the frequency of the read clock. The buffer further includes a number of storage cells substantially equal to the product of the maximum frequency offset between the write and read clocks and the maximum number of data units in the data stream, the storage cells responsive to the write pointer for receiving data units and the read pointer for providing data units.

These and other aspects and advantages of the present invention will become apparent from the following more detailed description, when taken in conjunction with the accompanying drawings which illustrate, by way of example, the preferred embodiments of the invention.

BRIEF DESCRIPTION OF THE DRAWINGS

FIG. 7 is a timing diagram depicting the writing and reading of data packets into and from the buffer of FIG. 4 in the following three states: when the write and read clocks operate at the same frequency, when the write clock is significantly faster than the read clock, i.e., an overrun condition, and when the write clock is significantly slower that the read clock, i.e., an underrun condition.

DETAILED DESCRIPTION OF THE PREFERRED EMBODIMENTS

Figure 1:
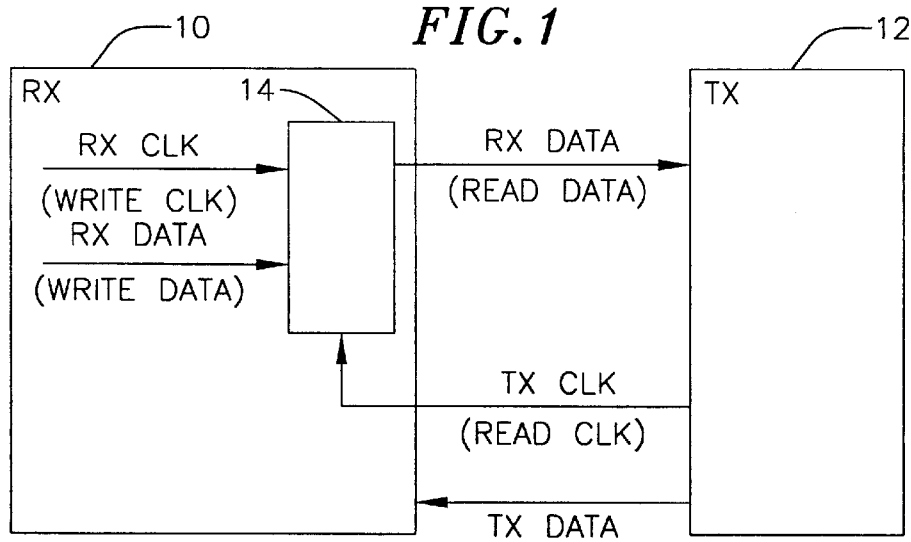
FIG. 1 is a block diagram of a communications system including an elasticity buffer operating in accordance with the present invention.
Figure 2:
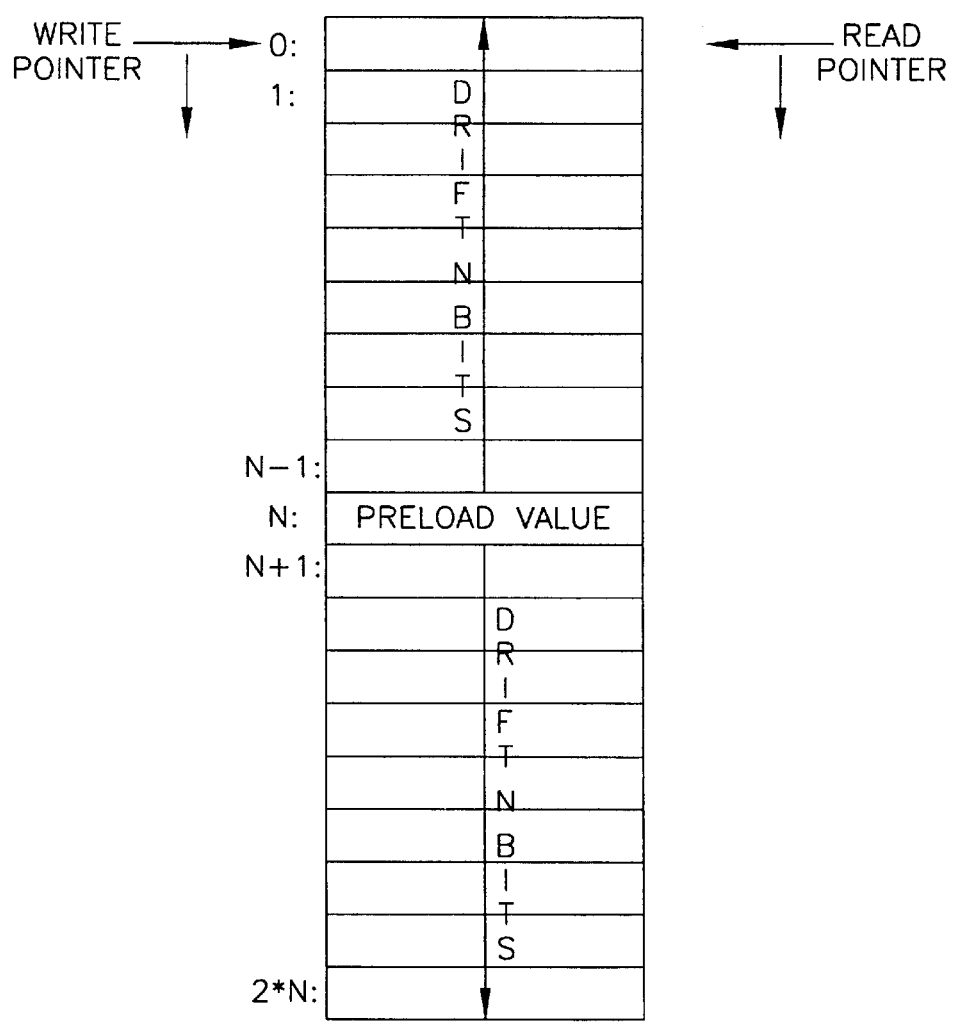
FIG. 2 depicts an FIFO buffer having 2N storage cells stacked for having data written to by a write pointer and data subsequently read from by a read pointer.
Figure 3A:
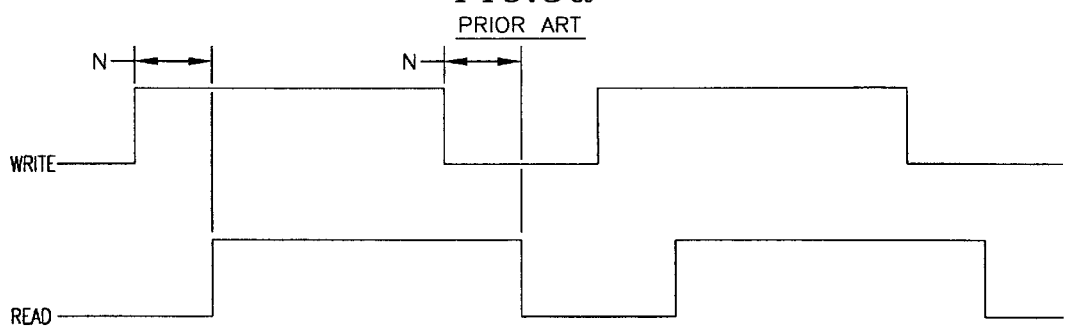
FIG. 3a is a timing diagram depicting the writing and reading of data packets into and from the buffer of FIG. 2 using write and read clocks that operate at the same frequency.
Figure 3B:
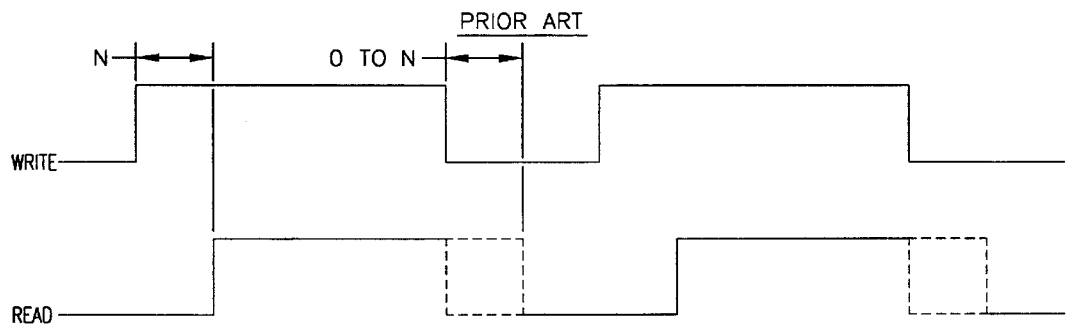
FIG. 3b is a timing diagram depicting the writing and reading of data packets into and from the buffer of FIG. 2 using a write clock having a frequency that is slower than the read clock frequency.
Figure 3C:
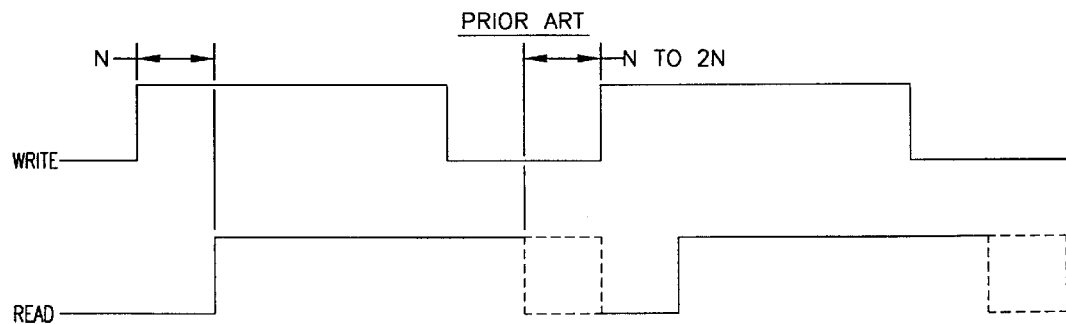
FIG. 3c is a timing diagram depicting the writing and reading of data packets into and from the buffer of FIG. 2 using write clock having a frequency that is faster than the read clock.

Data communication devices, such as shown in FIG. 1, includes a receiver (RX) 10, a transmitter 12, and a self-adjusting elasticity buffer 14. This buffer 14 is used to re-synchronize a data stream from one clock domain to another. Within the receiver 10, the data stream is written into the elasticity buffer 14 in accordance with a receive clock signal (RX CLK), i.e., write clock, in the form of original receive data (RX DATA), i.e., write data. The data contained within the data stream or packet may be in any of several forms such as 2-bit, 4-bit or 8-bit words. The RX DATA is subsequently read out of-the buffer-14 in accordance with a transmit clock signal (TX CLK), i.e., read clock. Thus when the read data is received by the transmitter 12 it is synchronous with the transmit clock.

Figure 4:
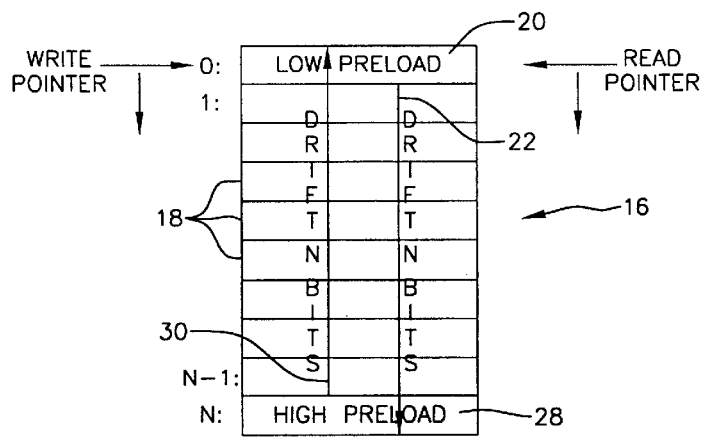
FIG. 4 depicts a self-adjusting elasticity buffer having N storage cells stacked for having data written to by a write pointer and data subsequently read from by a read pointer in either a low preload or high preload operating condition.

In accordance with the present invention, the self-adjusting elasticity buffer 14 is implemented by using a first-in first-out (FIFO) buffer that writes data words using a write pointer operating in accordance with a write clock and reads the data words using a read pointer operating in accordance with a separate read clock. With reference to FIG. 4, each of the words in the data stream is individually written into the FIFO buffer 16 in individual storage cells 18 beginning at 0, as indicated by the write pointer. The cells are stacked and identified by consecutive numbers beginning with 0 at the top and ending with N at the bottom, where N is defined by Eq. 2. Once data is written to the cell having the number 0 through N which is designated as the preload value, the read pointer starts to read data from the buffer beginning at cell 0. The write pointer continues to write data to buffer cells as the read pointer continues to read data. After writing data to the N cell the write pointer begins writing data to the 0 cell again, likewise, once the read pointer reads data from the N cell it begins reading data from the 0 cell again, thus the buffer is circular in nature.

At power up of the system the preload value of the system is set to a default value, which in a preferred embodiment of the invention is N/2. While any default value may be used, this default preload value is chosen because it is likely that the difference between the write clock and read clock frequencies is not large enough to cause an overrun or underrun condition when the preload value is N/2. If the difference between the write and read clocks is significant, the preload value is adjusted. Although the frequencies of the write and read clocks do not change significantly over time and in general, if one clock is significantly faster than the other it is always faster, individual clock frequencies tend to vary from chip to chip. Accordingly, it is not possible to determine, in advance of power up, which of the write or read clocks is faster.

Figure 5A:
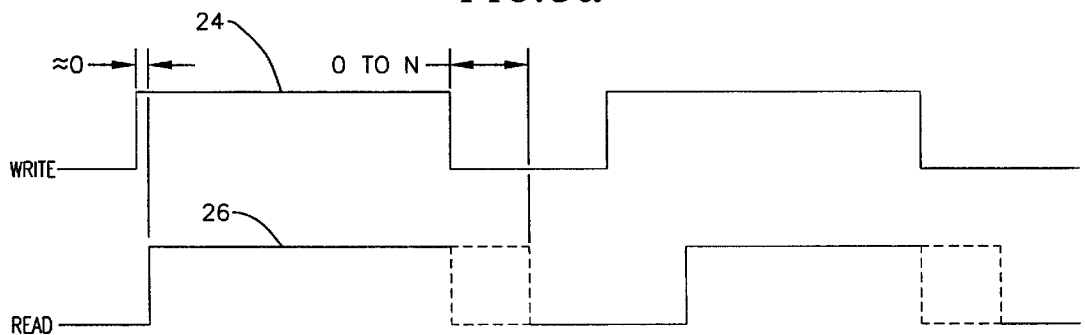
FIG. 5a is a timing diagram depicting the writing and reading of data packets into and from the buffer of FIG. 4 when operating in a low preload condition.

In accordance with the present invention, the preload value of the FIFO is adjusted to take into account the difference in the operating frequencies of the write and read clocks. To determine the preload value, the frequencies of the clocks are monitored during the course of the processing of the first several data packets. With reference to FIGS. 4 and 5a, if it is determined that the write clock is significantly faster than the read clock, then the preload value is set "low" 20 to substantially zero so that the read pointer begins reading data from cell 0 almost immediately after the write pointer writes data to the cell. In this situation, during the course of processing the remaining data within the data packet, the write pointer drifts ahead of the read pointer, as indicated by the downward arrow 22. Because the value of N is chosen based on the maximum possible offset between the write and read clock frequencies, as set forth in Eq. 2, there are enough storage cells in the buffer to ensure that the writing of data from the packet is complete before the write pointer overruns the read pointer. As shown in FIG. 5a, input data 24 from the first packet is no longer being written into the buffer while output data 26 continues to be read, as indicated by the dashed lines. Depending on the relative frequencies of the read and write clocks, the reading of data may continue from between 0 to N bits past the writing of data.

Figure 5B:
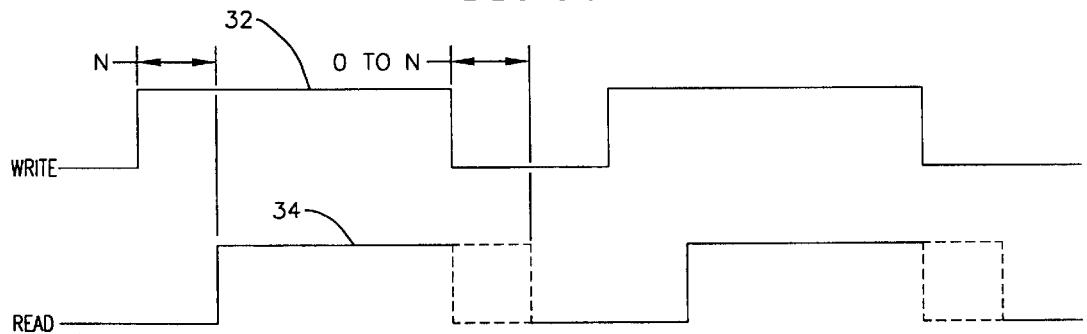
FIG. 5b is a timing diagram depicting the writing and reading of data packets into and from the buffer of FIG. 4 when operating in a high preload condition.

With reference to FIGS. 4 and 5b, if it is determined that the read clock is significantly faster than the write clock, then the preload value is set "high" 28 so that the read pointer does not begin reading data until just about the time that the write pointer writes data to the N cell. In this situation, during the course of processing the remaining data within the data packet, the write pointer drifts toward the read pointer, as indicated by the upward arrow 30. Again, because the value of N is chosen based on the maximum possible offset between the write and read clock frequencies, there are enough storage cells in the buffer to ensure that the writing of data from the packet is complete before the write pointer underruns the read pointer. As shown in FIG. 5b, input data 32 from the first packet is no longer being written into the buffer while output data 34 continues to be read, as indicated by the dashed lines. Depending on the relative frequencies of the read and write clocks, the reading of data may continue from between 0 to N bits past the writing of data.

Thus, as shown in FIGS. 5a and 5b, by monitoring the relative frequencies of the read and write clocks, the time at which the reading of data begins relative to the time at which the writing of data begins is adjusted to ensure that neither an overrun nor an underrun condition occurs. In the preferred embodiment, as discussed above, the preload values are set either to a fixed low value, i.e., substantially zero, or a fixed high value, i.e., N. It is possible, however, that the difference between the write clock and read clock frequencies is not significant enough to cause an overrun or underrun. In this situation the preload value remains the default preload value N/2. In other embodiments of the invention, the low and high values are not fixed at near 0 and near N, respectively. Instead, the low preload is set to any value less than the default preload while the high preload is set to any value greater than the default preload.

Figure 6:
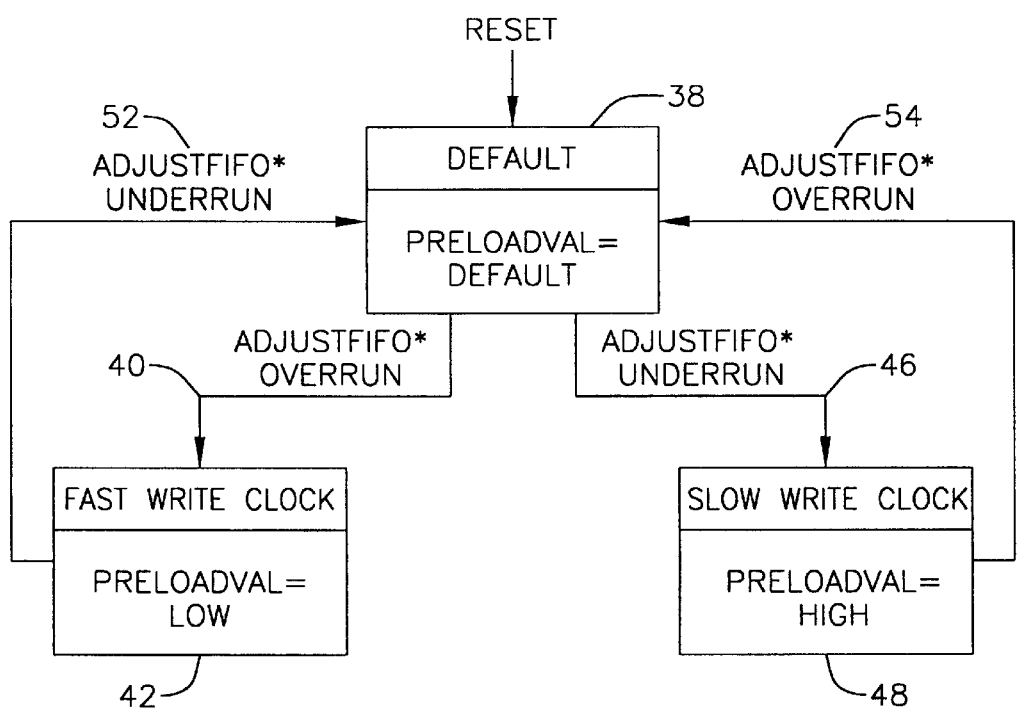
FIG. 6 is a state machine used to determine the preload value of the buffer of FIG. 4.

In accordance with the present invention, there are several techniques for determining whether the preload value should be set low or high or remain at the default value. In a first technique, a state machine, as shown in FIG. 6, is used to monitor for overrun and underrun conditions. As shown in FIGS. 6 and 7, at startup of the system and during the processing of the first packet of data 36, the preload value is set to a default value 38. Preferably, the default value is set to N/2. As mentioned above, this value is chosen as the default because the clock frequencies of most chips are not that far apart so N/2 is a relatively safe preload value which allows N/2 bits of drifting in either direction. During the writing of a data packet, the values of the write and read pointer FIFO counters are continuously compared to determine if the pointers remain N/2 apart or if they are drifting too close together or drifting too far apart. If there is a significant drift in either direction before the entire packet is written, a flag is set to indicate an overrun or underrun condition. As soon as the writing of data from the data packet is complete the monitoring of the counters ceases until the next data packet starts to be written.

If at anytime during the writing of data the value of the read counter is less than the value of the write counter by a value greater than or equal to the total number of storage cells in the buffer an overrun condition 40 exists. In this situation, the preload value is set low 42, which is a value close to zero. Accordingly, during the processing of the next packet of data 44, the read pointer begins reading almost immediately after the write pointer begins writing and the overrun condition is eliminated for each of the subsequent packets of data. If at anytime during the writing of data the value of the read counter is less than the value of the write counter an underrun condition 46 exists. In this situation, the preload value is set high 48, which is a value close to N. Accordingly, during the processing of the next packet of data 50, the start of the read pointer is delayed such that the read pointer lags the write pointer throughout the processing of the data packet and the underrun condition is eliminated for each of the subsequent packets of data.

In a preferred embodiment, the preload value is only adjusted when one clock is significantly faster than the other such that an overrun or underrun occurs. If the difference between the clocks is insignificant, then the preload value remains centered at the default value of N/2. For example, if the difference between the write and read counters is greater than 0 and less than N during the writing of a data packet then the preload value remains at N/2. It this situation, as shown in FIG. 7, there is neither an overrun nor an underrun condition. Accordingly, there is no need to adjust the preload value in either direction.

Once, the relative frequencies of the write and read clocks are determined and the preload value set, it is beneficial to continue to monitor the relative frequencies of the two clocks for changes. While the write and read clock frequencies of a system remain generally fixed, it is possible for the relative frequencies to change under certain operating conditions. For example, an error may have occurred during the initial determination of the read and write frequencies which may lead to an erroneous determination that the write clock is faster than the read clock. In this situation, as shown in FIG. 6, an underrun error 52 eventually occurs and the state machine is reset, as indicated by feedback path, and the preload value is redetermined. A similar situation may occur when it is initially determined that the write clock is slower than the read clock and a subsequent overrun condition 54 occurs. Relative write and read clock frequencies may change when the system containing the read clock is disconnected from the system containing the write clock and subsequently reconnected to a different system containing a different write clock. In this situation, the frequencies of the different write clock and the read clock need to be compared and the preload value reset and readjusted if necessary.

In a second technique for determining the preload value, the relative frequencies of the write and read clocks are determined by monitoring the FIFO read counter level upon completion of the writing of data. Again, a default preload value of words are written before the reading of words begins. In a preferred embodiment, the default value is set to N/2; thus the write pointer is initially N/2 clock cycles ahead of the read pointer. Upon completion of the writing of data, the number of words required to be read by the read pointer in order to empty the FIFO is counted. If the number of words counted is greater than N/2 the read clock is slower than the write clock and the preload value is set low to approximately zero. If the number of words counted is less than N/2 the read clock is faster than the write clock and the preload value is set high to N.

In a third technique of determining the preload value, the frequencies of the write and read clocks are measured using two frequency counters. These counters count the clock cycles for each clock during a fixed time period. The frequencies are then compared. If the write clock count is higher than the read clock count the preload value is set low to near zero. If the read clock count is higher than the write clock count the preload value is set high to near N. Technique three allows for the determination of the relative frequencies of the write and read clock at anytime; whereas techniques one and two allow for the determination of the relative frequencies only during the time when data packets are being processed.

The following table compares some of the operating characteristics of a standard elasticity buffer with that of the self-adjusting elasticity buffer. The table assumes that the FIFO overhead is much smaller than N. Overhead is the internal delays associated with overrun/underrun detection circuitry which introduce a delay between the time that an overrun/underrun condition occurs and the error indication. Accordingly, an overhead or tolerance, is added to the detection circuitry which compensates for this delay. Thus, while ideally an error indication occurs when both the read and write pointers are at the same buffer cell, e.g. N−1, the error indication occurs when the pointers are, for example, one or two cells apart. Thus when the write pointer is at N, an error indication occurs when the read pointer is at, for example, N−1 or N−2.

| Characteristic | Standard Elasticity Buffer (Prior Art) | Self-Adjusting Elasticity Buffer |
| --- | --- | --- |
| FIFO size | 2N | N |
| Latency at start of stream | N | 0 to N |
| Latency at end of stream | 0 to 2N | 0 to N |
| Maximum frequency offset | −N to +N | −N to +N |

Although this invention has been disclosed and illustrated with reference to particular embodiments, the principles involved are susceptible for use in numerous other embodiments which will be apparent to persons of ordinary skill in the art. The invention is, therefore, to be limited only as indicated by the scope of the appended claims.

In the claims:

1. A method of processing a plurality of data packets, said method comprising the steps of:

writing data in accordance with a frequency of a write clock;

reading data in accordance with a frequency of a read clock;

determining a relative frequency of the write and the read clocks; and continuing to read the data past the writing of the data based on the relative frequency of the read and write clocks;

wherein the step of continuing to read the data past the writing of the data continues from zero to N bits past the writing of data, with N being defined by:

$$N = \text{freq offset}_{max} \times \text{data length}_{max}$$

where freq offset$_{max}$=maximum frequency offset as determined by:

$$\text{freq offset}_{max} = (W_{freq} - R_{freq})/D_{rate}$$

and where
$W_{freq}$=frequency of write clock
$R_{freq}$=frequency of read clock
$D_{rate}$=data rate of the system
data length$_{max}$=maximum length of the data stream in words.

2. A buffer for allowing the influx and outflow of a number of data units forming a data stream, said buffer for use in a system having a write clock and a read clock, said buffer comprising:

a plurality of sequentially numbered storage cells located within the buffer;
a write pointer for writing data in accordance with a frequency of the write clock;
a read pointer for reading data in accordance with a frequency of the read clock; and
a preload value for delaying the start of the read pointer relative to the write pointer, wherein the preload value is based upon a number of transactions needed to empty the numbered storage cells.

3. The method of claim 1, wherein the number of transactions involve counting the number of words read by the read pointer in order to empty the storage cells.

4. A method of processing a plurality of data packets, each having a number of data units, through a buffer in accordance with a write clock and a read clock, the buffer having a plurality of sequentially numbered storage cells, said method comprising the steps of:

selecting an initial preload value;
writing the data units into the storage cells using a write pointer operating in accordance with the write clock
reading data units from the storage cells using a read pointer operating in accordance with the read clock; and
determining relative frequencies of the write and read clocks based upon a number of transactions needed to empty the storage cells.

5. The method of claim 4, further comprising:
for subsequent data packets, selectively adjusting the preload value to compensate for differences between the write frequency and the read frequency.

6. The method of claim 4, wherein the write pointer and read pointer each have a counter associated therewith and the step of determining the relative frequencies of the write and read clocks comprises:
at the end of the writing of a first data packet, counting the number of words read by the read pointer in order to empty the storage cells.

7. A method of processing a plurality of data packets, each having a number of data units, through a buffer in accordance with a write clock and a read clock, the buffer having a plurality of sequentially numbered storage cells, said method comprising the steps of:

selecting an initial preload value;
writing the data units into the storage cells using a write pointer operating in accordance with the write clock;
when the storage cell of the buffer having the number equal to the preload value has been written to, reading data units from the storage cells using a read pointer operating in accordance with the read clock;
determining the relative frequencies of the write and read clocks; and
for subsequent data packets, inversely adjusting the preload value based upon the relative frequency to compensate for differences between the write frequency and the read frequency.

8. The method of claim 7, wherein the step of adjusting the preload value comprises the step of:
if the write frequency is greater than the read clock frequency, setting the preload value to a low preload value having a value less than the initial preload value; and if the write clock frequency is less than the read clock frequency, setting the preload value to a high preload value having a value greater than the initial preload value.

* * * * *

UNITED STATES PATENT AND TRADEMARK OFFICE
CERTIFICATE OF CORRECTION

PATENT NO.   : 6,611,884 B2                                                     Page 1 of 1
DATED        : August 26, 2003
INVENTOR(S)  : Castellano It is certified that error appears in the above-identified patent and that said Letters Patent is hereby corrected as shown below:

<u>Title page,</u>
Item [73], Assignee, should read:
-- [73]   Assignee:   Broadcom Corporation, Irvine CA (US) --

Signed and Sealed this

Twenty-seventh Day of January, 2004

JON W. DUDAS
*Acting Director of the United States Patent and Trademark Office*